UNITED STATES PATENT OFFICE.

EUGENE ERDÖS, OF KOLOZSVÁR, AUSTRIA-HUNGARY, ASSIGNOR TO AZURIT COMPANY LIMITED FOR CHEMICAL INDUSTRY KOLOZSVAR, OF KOLOZSVÁR, AUSTRIA-HUNGARY.

PROCESS FOR EXTRACTING VALUABLE COPPER CONSTITUENTS FROM CUPRIFEROUS ORES AND THEIR GANGUES.

1,162,044.     Specification of Letters Patent.     Patented Nov. 30, 1915.

No Drawing.     Application filed February 26, 1914. Serial No. 821,328.

*To all whom it may concern:*

Be it known that I, EUGENE ERDÖS, a subject of the King of Hungary and Emperor of Austria, residing at 40 Kis utca, Kolozsvár, in the Empire of Austria-Hungary, have invented certain new and useful Improvements in Processes for Extracting Valuable Copper Constituents from Cupriferous Ores and Their Gangues, of which the following is a specification.

The low grade copper ores which contain copper compounds generally in the form of oxids ($Cu_nO_n$) carbonates $$(CuCO_3.Cu(OH)_2)$$

sulfids ($Cu_nS_n$) metallic copper (Cu) and in their various mixtures, are in most cases combined with relatively large quantities of gangues so that it is not profitable to subject them to the costly smelting process. The copper constituents of such low grade ores can be extracted by leaching, but by the leaching method hitherto adopted not only the copper, but also other metallic constituents and iron in particular are dissolved, so that it has been necessary to separate the copper compounds from the other metallic salts and subject them to a troublesome cleaning process.

Now the present invention relates to a simple chemical process for obtaining the copper constituents alone and consists broadly in employing aluminium sulfate as the solvent. Oxy salts including carbonates (hydrocarbonates) and also oxids can be employed without other preparation than disintegration. Sulfids and metallic ores are first of all converted into oxids by careful oxidizing roasting.

The aluminium sulfate does not attack the other metallic bases and with the copper the following re-actions occur:

I$^a$. *Oxids (or roasted ores).*

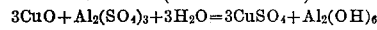
$$3CuO + Al_2(SO_4)_3 + 3H_2O = 3CuSO_4 + Al_2(OH)_6$$

I$^b$. *Carbonates.*

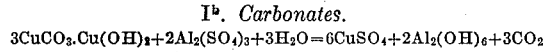
$$3CuCO_3.Cu(OH)_2 + 2Al_2(SO_4)_3 + 3H_2O = 6CuSO_4 + 2Al_2(OH)_6 + 3CO_2$$

Under the influence of the aluminium sulfate solution a sufficiently pure copper sulfate solution is therefore obtained. The aluminium hydroxid which is simultaneously formed remains in the residuum. The copper sulfate solution can then be further treated in the usual manner. This method of operation would, however, hardly meet practical requirements because large quantities of aluminium sulfate are necessary. If, however, the copper sulfate solution formed in accordance with the above equation is not at once discharged and the aluminium sulfate lye in excess employed, various subsidiary reactions occur and by their means it is possible to regenerate the aluminium sulfate and to extract the copper in a very rational manner.

Although aluminium sulfate and copper sulfate also are normal salts, nevertheless they have an acid re-action. As a result these sulfates tend to form basic salts in the present case with the copper base and the aluminium hydroxid.

II$^a$.
$$CuSO_4 + 2Al_2(OH)_6 = CuSO_4./Al_2(OH)_6/_2.$$

II$^b$.
$$Al_2(SO_4)_3 + 2Al_2(OH)_6 = Al_2(SO_4)_3./Al_2(OH)_6/_2.$$

III$^a$.
$$CuSO_4 + CuO + H_2O = CuSO_4.Cu(OH)_2$$

III$^b$.
$$Al_2(SO_4)_3 + 2CuO + 2H_2O = Al_2(SO_4)_3./Cu(OH)_2/_2.$$

These basic salts are however, loose compounds, which are insoluble in water with the exception of the soluble copper salt. Now if these basic salts are decomposed by sulfuric acid, the normal sulfates of the corresponding metal bases are formed in accordance with the following equations:—

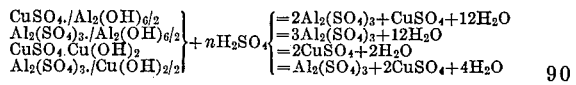

Now it is obvious that the aluminium sulfate introduced with the lye is completely regenerated. Consequently the aluminium sulfate acts similarly to a catalyzing agent and produces only the reactions I, II and III because the acid radical claimed by the cupric oxid is not covered by the acid radical of the aluminium sulfate, but by sulfuric acid in regenerating the sulfate.

The following is a practical example of a method of carrying the process into practice: The disintegrated ores after being treated in accordance with their compositions, are introduced into a tank or the like, which is preferably provided with agitator mechanism, whereupon the aluminium sulfate lye is added. In treating the ores, particularly when they contain sulfids, the roasting must be very carefully carried out in order to bring both the copper and more particularly the iron to their maximum value. The concentration of the aluminium sulfate lye depends upon the fineness of the disintegration, upon the distribution of the ores in the gangue and also upon whether the leaching is effected in a warm or cold operation. Care must also be taken that the copper sulfate that forms certainly remains in solution. Highly concentrated lyes should not be employed, because this would act disadvantageously in the subsequent separation of the copper sulfate from the aluminium sulfate. It is advantageous to employ the aluminium sulfate lye in a state of dilution which corresponds to $\frac{1}{10}$% of the acid radical of the copper sulfate theoretically obtainable from the copper oxid present relatively to the acid radical of the aluminium sulfate.

When the acid has reacted on the mass of ore for a long time, the reactions $I^a$ (or $I^b$) $II^a$ $III^a$ and $III^b$ take place. In addition to gangue and other ore constituents, the mass therefore simultaneously contains free aluminium sulfate, copper sulfate, aluminium oxid, cupric oxid and the basic salts described above. Now sulfuric acid is added to the mass in sufficient quantity for producing the reactions indicated under IV. An excess of sulfuric acid should be carefully avoided as otherwise the $Fe_2O_3$ is dissolved. When mixing is effected, the sulfuric acid added is at once consumed by the loose basic compounds. After the lapse of a short period of time during which the copper and aluminium sulfates that have been liberated as shown in the reactions IV, react with additional quantities of cupric oxid (and aluminium hydroxid) the basic salts are again decomposed with sulfuric acid and these operations are repeated in adding fresh quantities of sulfuric acid until the whole of the cupric oxid of the charge is converted into copper sulfate. The cupric oxid contained in the ores is completely leached in this manner in a few hours if the operation is carried out in heat. When the leaching is cold, the reaction is more sluggish so that in this case it is advantageous to employ a somewhat concentrated aluminium sulfate solution. The ores (which have been dressed if necessary) are introduced into a filter tank or the like whereupon the aluminium sulfate lye is poured on to the contents of the tank.

The liquid collecting in a collecting vessel contains copper sulfate $CuSO_4.Cu(OH)_2$ and some aluminium sulfate. The insoluble copper and aluminium compounds and aluminium hydroxid remain behind in the mass. Sulfuric acid in measured quantities is then added, so that normal sulfate solutions now exist and these mixed with the previous contents of the collector vessel are again poured on to the contents of the tank. The previous operation then recommences and the alternate pouring (the pouring of pure sulfuric acids alternating with that of the contents of the collector vessel) is continued until the cupric oxid contained in the charge, is exhausted. If the solution contains any ferri sulfate (either as a result of inattention in the roasting operation or owing to the addition of sulfuric acid) it can be eliminated by CuO in heating in the sense of the following reaction:

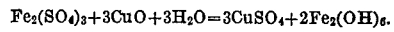

$Fe_2(SO_4)_3 + 3CuO + 3H_2O = 3CuSO_4 + 2Fe_2(OH)_6$.

After the leaching has been effected the solution contains mainly copper sulfate, and in addition aluminium sulfate that was originally added to the lye. The solution can be separated in any convenient way from the solid parts by filtration for example.

The separation of the copper sulfate from the aluminium sulfate can be carried out in various ways. For example the copper can be obtained in the form of pure copper sulfate by inspissation and fractional crystallization. A double aluminium-copper salt is known,

$CuSO_4.7H_2O.Al_2(SO_4)_3.7H_2O$.

This double salt which contains 14 molecules of water of crystallization, dissolves in water much more readily than the crystallizing copper sulfate pentahydrate $CuSO_4.5H_2O$. The inspissation of the solution is continued until only as much water remains as is sufficient to keep the said double salt in solution even after cooling. After cooling the $CuSO_4.5H_2O$ separates out in beautiful triclinic crystals. It will be understood that at least so much copper sulfate remains in the mother lye as corresponds to the above formula of the double salt. As, however, the mother lye is employed for the next leaching operation, the separation causes no loss.

The separation of the copper sulfate can also be effected by inspissation while constantly agitating. Copper sulfate pentahydrate is soluble at 70° C. in a quantity of water equal to its own weight; aluminium sulfate, on the other hand, remains in solution in its own water of crystallization: $Al_2(SO_4)_3.18H_2O$. If the inspissation be properly carried out the greater part of the copper sulfate is separated out in the form of crystalline powder.

In addition to aluminium sulfate other compounds containing aluminium sulfate such for example as alum can be employed in the present process as the leaching agent.

All similar aluminium compounds or mineral containing aluminium which with sulfuric acid furnish aluminium sulfate, can also be employed for the same purpose.

Certain ores, such as ores containing feldspar for example, can be roasted in such a manner that aluminium sulfate is formed in them after roasting. In such cases the leaching effected in accordance with reactions I, II, III and the decomposing reaction IV can advantageously be carried out with pure water, to which, however, aluminium sulfate may be added in some cases.

The present process is also well suited for the treatment of copper ores containing precious metals. If the percentage of copper is high obviously the cyanid process which is otherwise generally employed is not profitable, but after the copper has been extracted by the present process these ores can be cyanized without difficulty.

What I claim and desire to secure by Letters Patent of the United States is:—

1. Process for extracting valuable copper constituents from materials containing the same consisting in disintegrating the said materials and thereafter leaching the same with aluminium sulfate solution.

2. Process for extracting valuable copper constituents from materials containing the same consisting in disintegrating the said materials, roasting the said materials and thereafter leaching the same with aluminium sulfate solution.

3. A method of extracting valuable copper constituents from materials containing the same consisting in disintegrating the materials treating the disintegrated materials with aluminium sulfate solution and thereafter adding sulfuric acid.

4. A method of extracting valuable copper constituents from materials containing the same consisting in disintegrating the materials, roasting the disintegrated materials, treating the latter with aluminium sulfate solution and, when basic copper and aluminium salts have been formed by the reaction, adding sulfuric acid.

5. Process for extracting copper constituents from materials containing the same consisting in disintegrating the said materials, leaching with aluminium sulfate solution, adding sulfuric acid when the basic copper and aluminium salts have been formed, periodically adding fresh quantities of sulfuric acid until the cupric oxid contained in the charge is completely exhausted by the action of the aluminium sulfate which is continually reformed by the fresh additions of sulfuric acid and of the copper sulfate by the intermediary of the basic salts produced in the subsidiary reactions.

6. Process for extracting valuable copper constituents from materials containing the same consisting in disintegrating the said materials, allowing aluminium sulfate solution to flow through the said materials, collecting the solution which flows off, pouring sulfuric acid on the said materials, pouring on the fresh solution of copper and aluminium sulfate produced by the action of the sulfuric acid together with the previous solution, draining off the solution, adding more sulfuric acid, and continuing the said additions alternately until the whole of the cupric oxid contained in the charge is extracted.

7. Process for extracting valuable copper constitutents from materials containing the same consisting in first preparing the materials and thereafter leaching with a solution containing aluminium sulfate.

8. Process for extracting valuable copper constituents consisting in preparing the materials, leaching the same with aluminium sulfate solution, concentrating the copper and aluminium sulfate solutions by inspissation until the quantity of water is still sufficient to maintain the double salt

$CuSO_4.7H_2O.Al_2(SO_4)_3.7H_2O$ in solution even in a cold state, whereupon on cooling only the copper sulfate pentahydrate is crystallized out.

In testimony whereof I affix my signature in presence of two witnesses.

EUGENE ERDÖS.

Witnesses:
GILES SCHWARZ,
ANDREW KELEMEN.